United States Patent [19]

Poirier

[11] 4,259,018
[45] Mar. 31, 1981

[54] OPTICAL TRACK GAGE MEASURING DEVICE

[75] Inventor: Paul J. Poirier, South Hamilton, Mass.

[73] Assignee: The United States of America as represented by the Secretary of the Department of Transportation, Washington, D.C.

[21] Appl. No.: 962,239

[22] Filed: Nov. 20, 1978

[51] Int. Cl.³ .................... G01B 11/14; G01C 3/24
[52] U.S. Cl. ........................................ 356/375; 356/1
[58] Field of Search ................... 356/372, 375, 376, 1, 356/4; 33/287

[56] References Cited

U.S. PATENT DOCUMENTS

| | | | |
|---|---|---|---|
| 2,317,652 | 4/1943 | Toney | 250/224 |
| 2,468,042 | 4/1949 | Cranberg | 356/4 |
| 3,864,039 | 2/1975 | Wilmarth | 356/372 |
| 3,895,870 | 7/1975 | Cullen et al. | 356/1 |
| 4,040,738 | 8/1977 | Wagner | 356/1 |
| 4,181,430 | 1/1980 | Shirota et al. | 33/287 |

Primary Examiner—Stewart J. Levy
Assistant Examiner—Wm. H. Punter
Attorney, Agent, or Firm—Herbert E. Farmer; Harold P. Deeley, Jr.

[57] ABSTRACT

The invention is a system for measuring the gage of railroad tracks and includes a pair of sensor probes mounted a fixed distance apart on a wheeled vehicle traveling along two rails and each located in positions horizontally adjacent to one of the rails. Each of the probes retains spaced apart first and second collimated light sources that direct first and second light beams at incident angles against the inner surface of the adjacent rail head at points five-eighths of an inch from the top surface thereof. After reflection from the rail head the first and second beams produce images in an optical receiver also retained by the probe. A detector produces an output dependent upon the spacing between the first and second beam image centers which is in turn dependent upon the distance between the probe and the adjacent rail head. Thus, the measured distances provided by the two probes in addition to the fixed spacing therebetween establishes rail gage in a plane five-eighths of an inch below the top surfaces of the rails.

5 Claims, 6 Drawing Figures

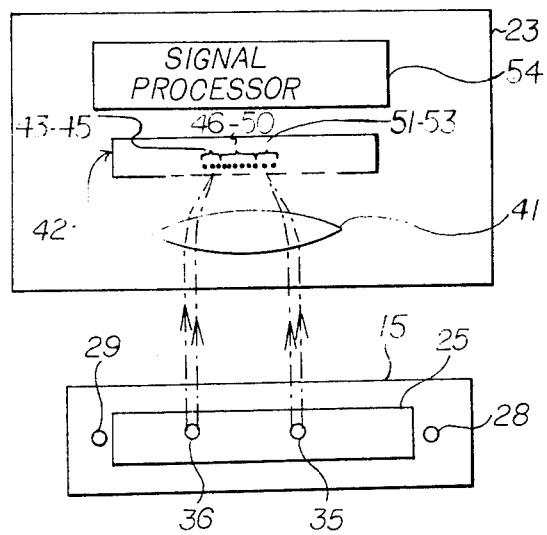
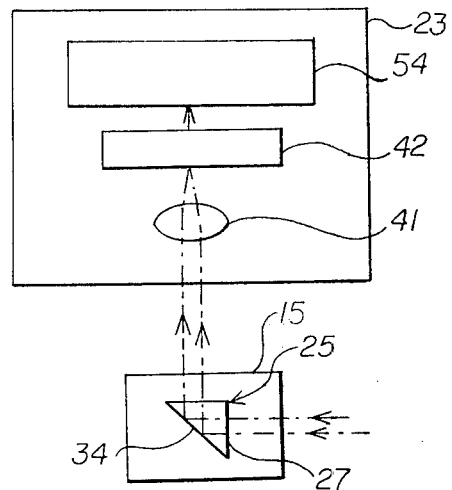
FIG.4  FIG.5
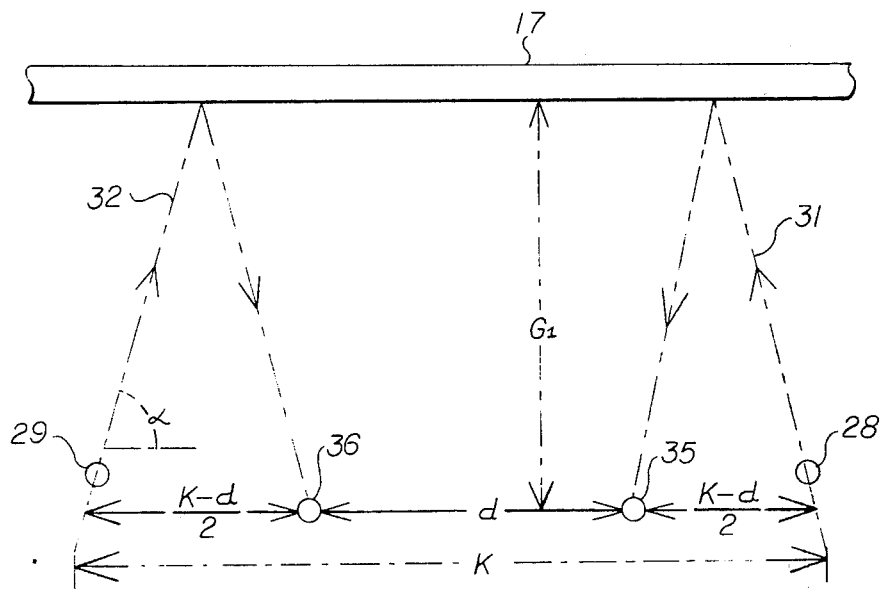
FIG.6

OPTICAL TRACK GAGE MEASURING DEVICE

ORIGIN OF THE INVENTION

The invention described herein was made by an employee of the U.S. Government and may be manufactured and used by or for the Government for governmental purposes without the payment of any royalties thereon or therefor.

BACKGROUND OF THE INVENTION

This invention relates to apparatus for measuring the gage of any given track, and more particularly, to apparatus which can be affixed to revenue producing trains which pass over the tracks in question and provide electrical signals representative of the gage of the track while the train travels at high speeds.

The gage of a pair of rails is defined as the distance between the rails measured at a point five-eighths of an inch below the top surface of the rail heads. Standard gage is specified as 56½ inches. While there are some exceptions to this the great majority of rail systems use standard gage. Regardless of what gage system is in use, a major cause for concern is when the gage due to wear, faulty construction or any other reason becomes enlarged. With standard gage, no track should be permitted a gage enlarged more than one inch and a quarter.

With the advent of high speed commuter traffic between the various communities some means must be provided to measure the gage of the rails forming the track on a regular basis. Such information would enable the appropriate parties to schedule maintenance of the rails because the gage is an important factor relating to condition of the rails. Apparatus which would permit this to be accomplished rapidly and on a continuous basis would avoid tragic derailments and other accidents associated with deteriorating foundations supporting the tracks in question.

Prior art devices for measuring the gage of railroad track from fast moving railroad trucks have comprised primarily a pair of proximity sensors spaced a fixed distance apart and each observing one of the rails. Such devices have suffered from a number of disadvantages including requirements for moving parts, inadequate response times, complicated alignment procedures, etc.

Specific types of proximity sensors that have been developed for this purpose include capacitive, magnetic and electro-optical sensors. The capacitive or magnetic sensors suffer from poor sensitivity at large air gaps and measurement distortions caused by rail components such as rail webs and rail bases that are extraneous to gage. Although this problem can be overcome by servo-driven gage sensors that maintain a small air gap regardless of gage variations, the resultant moving parts present longevity problems in the rugged rail environment.

Many of the above problems are obviated by an electro-optic sensor disclosed in U.S. Pat. No. 3,864,039. The system disclosed in that patent floods the inside base of the rail with light and detects the position of the shadow boundary between the rail head and the illuminated base, via an electro-optical detector mounted on the truck above the rail head. The position of the shadow boundary represents the innermost location of the rail head which represents gage in an absolute sense, i.e., the minimum distance between the rails. It does not, however, represent effective gage as defined by the track standards established by the Department of Transportation/Federal Railroad Administration. It also senses joint bars on jointed rail which protrude into the profile being measured. As noted above, those track standards define gage as the distance between the rails measured in a plane that is five-eights of an inch below the top of the rail heads. This is a more practical definition than minimum distance which can be affected by thin overhanging lips that develop on the inside profile of rail heads. Such a condition often occurs on the low rail of curved track and the resultant lip is ineffective to support the wheel of a railroad truck. Thus, a gage measurement influenced by such a lip provides a false sense of security in terms of safety. Similarly, a rail badly worn along its upper surface but of normal width at the base of the rail head establishes a minimum distance between rails that would indicate safer track than is actually the case.

The object of this invention, therefore, is to provide an improved, relatively simple device that accurately measures rail gage in a plane that is five-eighths of an inch below the top of the rail heads, is easy to align and requires no moving parts.

SUMMARY OF THE INVENTION

The invention is a system for measuring the gage of railroad tracks and includes a pair of sensor probes mounted a fixed distance apart on a wheeled vehicle traveling along two rails and each located in positions horizontally adjacent to one of the rails. Each of the probes retains spaced apart first and second collimated light sources that direct first and second light beams at incident angles against the inner surface of the adjacent rail head at points five-eighths of an inch from the top surface thereof. After reflection from the rail head the first and second beams produce images in an optical receiver also retained by the probe. A detector produces an output dependent upon the spacing between the first and second beam image centers, which is in turn dependent upon the distance between the probe and the adjacent rail head. Thus, the measured distances provided by the two probes in addition to the fixed spacing therebetween establishes rail gage in a plane five-eighths of an inch below the top surfaces of the rails.

In a preferred embodiment of the invention each of the optical receivers comprise a prism that directs the reflected beam images to a photodetector comprising a linear array of photodiodes positioned above the probe. The spacing between the centers of the strings of photodiodes energized by the reflected first and second beam images indicate the spacing between the probe and the adjacent rail head. According to this arrangement, the relatively expensive detector portion of the system is located in a protected position above the rail heads while only the relatively inexpensive and easily replaceable light sources and beam directive prisms are located in a more vulnerable position adjacent the rail head.

According to one feature of the invention, the collimated light sources comprise narrow beam infrared light emitting diodes. The infrared light produced by the diodes is in a spectrum for which the photodiodes in the detector have maximum sensitivity. In addition, a system utilizing infrared light sources is much less sensitive to background light noise than would be the case for a system utilizing visible light.

DESCRIPTION OF THE DRAWINGS

These and other objects and features of the present invention will become more apparent upon a perusal of the following description taken in conjunction with the accompanying drawings wherein:

FIG. 4 is a schematic diagrammatic side view of one of the probe and detector assemblies utilized with the apparatus of FIGS. 1 and 2;

FIG. 5 is a front view of the assemblies shown in FIG. 4; and

FIG. 6 is a diagrammatic top view of the geometry utilized to establish rail gage with the apparatus shown in FIGS. 1-5.

DESCRIPTION OF THE PREFERRED EMBODIMENT

Figure 1:
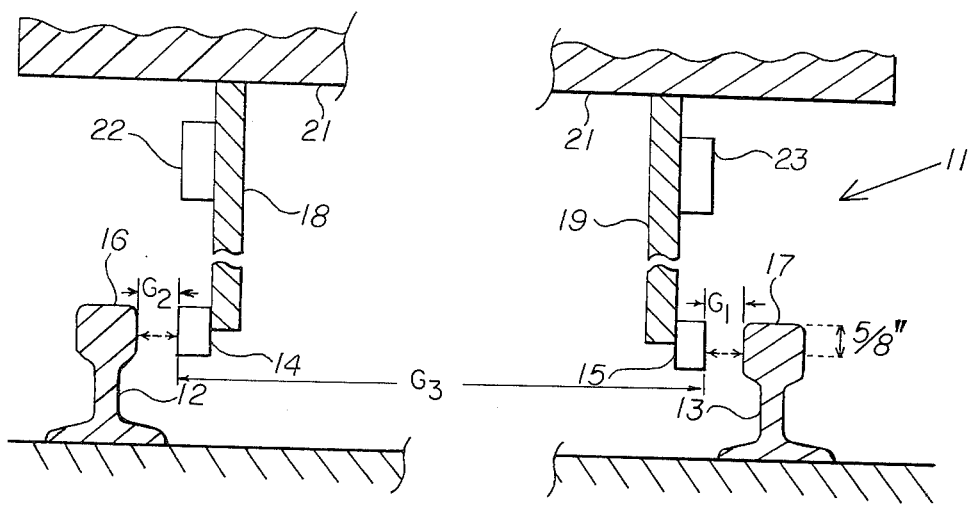
FIG. 1 is a schematic front view of a track gage measurement system according to the invention.
Figure 2:
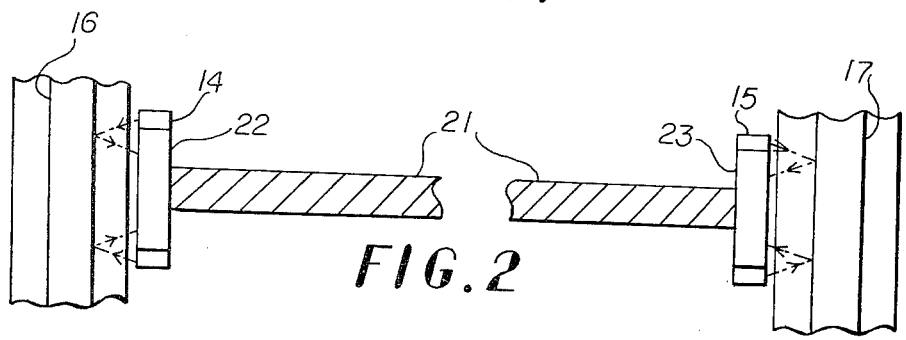
FIG. 2 is a top view of the track gage measurement system shown in FIG. 1.

Referring now to FIGS. 1 and 2, there is shown a system 11 for measuring gage between a pair of rails 12 and 13 that make up a section of track accommodating the movement of revenue producing trains. Included in the system 11 is a pair of sensor probe assemblies 14 and 15, one positioned horizontally adjacent to the interior surface of each of a pair of rail heads 16 and 17 of the rails 12 and 13. The probe assembly 14 is mounted on a bracket 18 while the probe assembly 15 is mounted on a bracket 19. Supporting the brackets 18 and 19 so as to maintain a fixed spacing between the probe assemblies 14 and 15 is a rigid, elongated beam 21 that is in turn affixed to a train truck assembly (not shown) traveling on the rails 12 and 13. Also mounted on the bracket 18 directly above the probe assembly 14 is a detector assembly 22 that is described in greater detail below. Similarly, a detector assembly 23 is mounted on the bracket 19 directly above the probe assembly 15.

Figure 3:
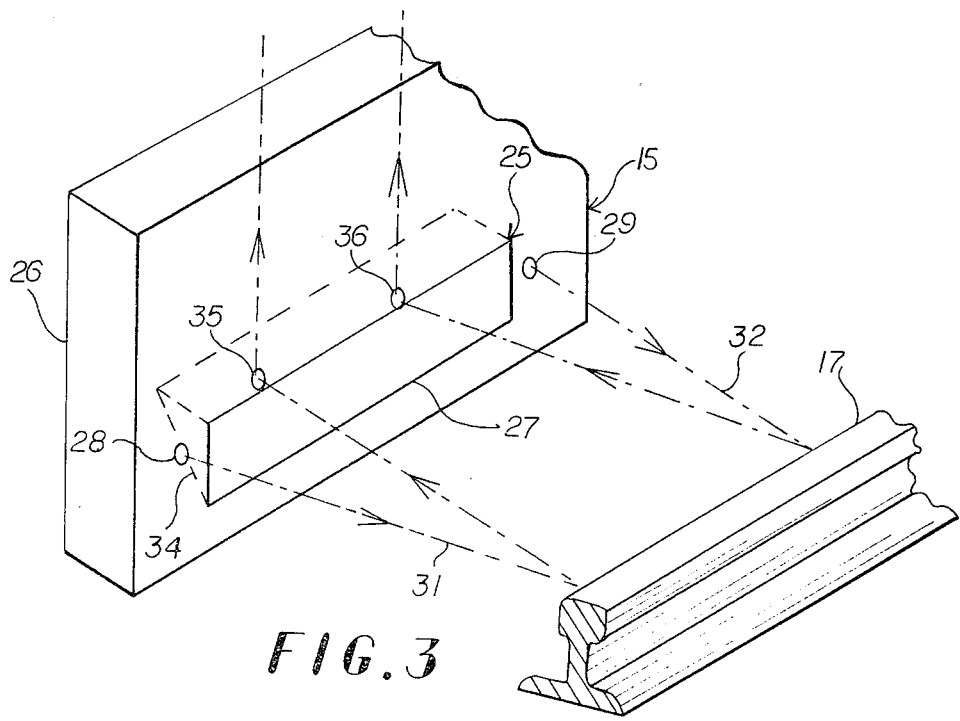
FIG. 3 is a perspective view of one of the probes utilized with the apparatus shown in FIGS. 1 and 2.

Referring now to FIG. 3, there is shown a perspective view of the probe assembly 15 that is shown in FIGS. 1 and 2 and is constructed identically to the probe assembly 14. The probe assembly 15 includes a light receiver optical prism 25 retained by a probe housing 26 and having a vertical front face 27 facing the rail head 17. Also retained by the housing 26 adjacent to one end of the prism 25 is a first collimated light source 28, preferably a narrow beam infrared light emitting diode. Retained by the housing 26 adjacent to the other end of the prism 25 is a second collimated light source 29, also preferably a narrow beam infrared light emitting diode. The first light source 28 directs a first light beam 31 at an incident angle against the inner surface of the rail head 17 at a point five-eighths of a inch from the upper surface thereof as depicted in FIG. 1. Similarly, the second light source 29 directs a second light beam 32 at an incident angle against the inner surface of the rail head 17, also at a point five-eighths of an inch from the upper surface thereof. The first and second light beams 31 and 32 are reflected by the rail head 17 into the prism 25 forming on the inclined back face 34 thereof images 35 and 36 of the first and second light sources 28 and 29. The images 35 and 36 are in turn directed by the rear face 34 of the prism 25 upwardly to the detector assembly 23 for processing therein as described below.

Referring now to FIGS. 4 and 5, there are shown front and side schematic views that diagrammatically illustrate the interaction between the probe assembly 15 and the detector assembly 23. Again, the functional relationship between the detector assembly 22 with the probe assembly 14 is identical to that described herein with regard to the probe assembly 15 and the detector assembly 23. Reflections of the first and second images 35 and 36 are directed upwardly by the rear face 34 (FIG. 3) of the beam directing prism 25 to a converging lens 41 in the detector assembly 23. The lens 41 focuses the image reflections onto a photodetector 42 comprised, for example, of 11 photodiodes 43-53. Receiving the output of the photodetector 42 is a signal processing unit 54 also retained by the detector assembly 23.

Referring now to FIG. 6 there is diagrammatically demonstrated the manner in which the system 11 is used to establish rail gage. As illustrated in FIG. 6, $G_1$ represents the distance between the five-eighths inch point on the rail head 17 and a measuring reference point in the sensor probe 15. Also depicted in FIG. 6 is a distance d representing the spacing between the first and second image centers 35 and 36 produced on the rear face 34 of the prism 25. The distance d is geometrically related to the distance $G_1$ by $G_1 = (K - d/4) \times \tan \alpha$ where K represents the distance between the first and second light sources 28 and 29 as referenced to surface 34 and $\alpha$ is the complement of the equal incident angles at which the first and second light beams 31 and 32 impinge upon the surface of the rail head 17. Similarly, $G_2$ would represent the distance between the five-eighths inch point on the rail head 16 and a measuring reference point in the sensor probe 14. Thus, the total measured gage G of the rails 12 and 13 is equal to $G_1 + G_2 + G_3$, where $G_3$ represents the spacing between the measuring reference points in the probe sensors 14 and 15 as depicted in FIG. 1. The measured variable d representing the spacing between the reflected first and second image centers 35 and 36, therefore, can be used with other known parameters to establish the gage at any point along the rails 12 and 13. It will be obvious that after direction of the images 35 and 36 by the lens 41 onto the photodetector 42, the particular diode strings 43-45 and 51-53 energized therein will provide signals indicative of the distance d. Thus, the signal processor 54 can utilize the output of the photodetector 42 to indicate the measured gage G at the five-eighths inch points between the rail heads 16 and 17.

A sensor probe utilizing a pair of collimated light sources a fixed distance apart and oriented to project two beams of light onto a rail is a preferred embodiment of the invention. The use of two distinct beams simplifies alignment of the probe and provides the capability of establishing gage value when passing through rail gaps ranging up to 2½ inches. Nevertheless, gage could be established also with a probe employing only a single light source. This is apparent from the above formula wherein the value $(K - d/4)$ can be derived from either of the light sources 28 or 29 and, respectively, the reflected images 35 or 36 thereof. In the case of a single light source, the position of an energized photodiode string 43-45 in the photodetector 42 with respect to some reference photodiode in the linear array therein would indicate the sensed spacing between the light source and the reflected image thereof. The single output of that string of diodes could be used by the signal processor 54 to establish gage. An advantage of the two-light source system, however, is that the specific locations within the photodetector 42 of the energized diode strings 43–45 and 51–53 are not critical since the required dimension d is directly dependent upon the spacing between the centers of the energized diode strings. Thus, optical alignment of the two-light source system is simplified.

As illustrated in FIG. 1 only the probe assemblies 14 and 15 of the measurement system 11 are located in close proximity to the rails 12 and 13 and those assemblies comprise relatively inexpensive components of the system. Conversely, the more expensive components forming the detector assemblies 22 and 23 are located in more remote positions not subject to the risk of damage that is present near the rails. Furthermore, the risk of damage to the sensor probes 14 and 15 can be reduced by employing a hinged mounting system (not shown) spring loaded so as to retract upon impact with extraneous objects and then automatically return into operative position.

Obviously, many modifications and variations of the present invention are possible in light of the above teachings. For example only, the infrared light sources 28 and 29 could be replaced by other types of narrow beam collimated sources, the light directing prisms 25 could be replaced by appropriately oriented reflecting mirrors or fiber optic cable, the converging lenses 41 could be replaced by image reducing fiber optics, etc. It is to be understood, therefore, that the invention can be practiced otherwise than as specifically described.

What is claimed is:

1. Rail gage apparatus comprising in combination with a wheeled vehicle for traveling along two rails having opaque rail heads:
   a pair of collimated light sources mounted a fixed distance apart on said vehicle and each disposed to direct a light beam onto a different one of the rails, each of said beams impinging at an incident angle on the inner surface of the rail head at a point a given distance from the top surface thereof;
   a light receiver means associated with each of said light sources and oriented to receive an image of said light source after reflection of said light beam from the rail head;
   a detector means for producing outputs dependent on the distances between each of said reflected image centers and their respective references;
   wherein said light sources and said light receiver means form probe assemblies mounted substantially horizontally adjacent to the rail heads, said detector means are mounted above said probe assemblies, and said light receiver means comprise optical director means for directing said images to said detector means; and
   wherein each of said probe assemblies comprises a second collimated light source disposed to direct a second light beam onto a different one of the rails, each of said second beams impinging at an incident angle on the inner surface of the rail head at a point said given distance from the top surface thereof, and each of said light receiver means receives an image of both said light source and said second light source associated therewith.

2. An apparatus according to claim 1 wherein said detector means provides outputs dependent on the distance between the centers of said light source image and said second light source image received by each of said light receiver means.

3. An apparatus according to claim 2 wherein said optical director means comprises a pair of prisms, one for receiving and transmitting said light beam and said second light beam after reflection from each of the rails.

4. An apparatus according to claim 3 wherein said detector means comprises a pair of photodiode arrays, one for receiving reflected images from each of said respective prisms.

5. An apparatus according to claim 4 wherein said light sources comprise narrow beam collimated infrared light sources.

* * * * *